(12) United States Patent
Reyes et al.

(10) Patent No.: US 11,593,004 B1
(45) Date of Patent: Feb. 28, 2023

(54) OPTIMIZED ADDITION AND REMOVAL OF COMPUTE RESOURCES IN A DISTRIBUTED STORAGE PLATFORM BY IMPLEMENTING MAPPING CHANGES IN A SHARED STORAGE SUBSYSTEM

(71) Applicant: International Business Machines Corporation, Armonk, NY (US)

(72) Inventors: Sergio Reyes, Austin, TX (US); Brian Chase Twichell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/401,561

(22) Filed: Aug. 13, 2021

(51) Int. Cl.
*G06F 3/06* (2006.01)

(52) U.S. Cl.
CPC .......... *G06F 3/0631* (2013.01); *G06F 3/0604* (2013.01); *G06F 3/067* (2013.01); *G06F 3/0665* (2013.01)

(58) Field of Classification Search
CPC .... G06F 3/0631; G06F 3/0604; G06F 3/0665; G06F 3/067
USPC ....................................................... 711/153
See application file for complete search history.

(56) References Cited

U.S. PATENT DOCUMENTS

| 10,776,035 | B2 | 9/2020 | Sato | |
| 2018/0024964 | A1* | 1/2018 | Mao | G06F 1/3268 |
| | | | | 711/173 |
| 2020/0097204 | A1* | 3/2020 | Sato | G06F 11/203 |
| 2020/0348863 | A1* | 11/2020 | Venkatesan | G06F 3/0659 |
| 2022/0261286 | A1* | 8/2022 | Wang | G06F 13/16 |

OTHER PUBLICATIONS

"Discover—Ceph", Ceph © 2021, 7 pages, <https://ceph.io/en/discover/>.
Lim, et al., "Disaggregated Memory for Expansion and Sharing in Blade Servers", Proceedings of the 36th Annual International Symposium on Computer Architecture, Jun. 2009, pp. 267-278.
Mell et al., "The NIST Definition of Cloud Computing", NIST, National Institute of Standards and Technology, Special Publication 800-145, Sep. 2011, 7 pages.

* cited by examiner

*Primary Examiner* — Than Nguyen
(74) *Attorney, Agent, or Firm* — Edward P. Li

(57) ABSTRACT

Computer-implemented methods for optimized compute resource addition and removal in a distributed storage platform. In a case of a newly added compute resource being connected to a storage subsystem shared by compute resources in the distributed storage platform, the distributed storage platform formulates a redistribution plan to redistribute a subset of a global address space of the storage subsystem to a newly added logical volume in the storage subsystem. In a case of a removed compute resource being disconnected from the storage subsystem, the distributed storage platform formulates a redistribution plan to redistribute respective logical blocks in a logical volume for the removed compute resource to respective remaining logical volumes for respective remaining compute resources in the distributed storage platform. The distributed storage platform executes the redistribution plan to reassign data block ownerships on one or more physical memory devices in the storage subsystem.

16 Claims, 12 Drawing Sheets

– 1 –

OPTIMIZED ADDITION AND REMOVAL OF COMPUTE RESOURCES IN A DISTRIBUTED STORAGE PLATFORM BY IMPLEMENTING MAPPING CHANGES IN A SHARED STORAGE SUBSYSTEM

BACKGROUND

The present invention relates generally to compute resources in a distributed storage platform, and more particularly to optimized addition and removal of compute resources in a distributed storage platform by implementing mapping changes in a shared storage subsystem.

Distributed storage platforms provide a means to store and retrieve large amounts of data spread across multiple compute resources. A fundamental selling point for such distributed storage platforms is their scalability; not only can the distributed storage platforms manage large amounts of data, but they can also grow as needs grow. The distributed storage platforms are typically constructed from storage and compute resources. The storage resources are entities that have the capability to store and retrieve data from non-volatile media. The compute resources are typically server-like platforms that field storage requests and map those requests to the storage resources. The compute resources may also implement advanced storage functions such as erasure-coding, replication, and deduplication.

Distributed storage platforms should maintain balance in the face of growth, i.e., after new resources are added, the storage platform should automatically rebalance so that the workload is evenly spread. By maintaining workload balance, local bottlenecks which limit the overall performance capability of the platform are avoided.

When a new compute resource is added to a distributed storage platform, it is inherently necessary to redistribute storage over compute resources in order to achieve balance. In a distributed storage platform where each compute resource has locally-attached storage, the only way to rebalance after adding a compute resource is to move some data from existing compute resources to the newly added compute resource. Such operations can involve moving large amounts of data, which in turn consumes system resources and takes a long period of time. In a distributed storage platform where multiple compute resources are attached to a shared (i.e., storage area network-attached or SAN-attached) storage subsystem, all compute resources have access to all data on the storage subsystem, so physical data moves can potentially be avoided during a rebalance. Unfortunately, in naïve implementations, the compute resources and storage subsystem lack the shared common understanding needed to avoid the physical data moves, and physical data moves still take place.

SUMMARY

In one aspect, a computer-implemented method for optimized addition of a compute resource in a distributed storage platform is provided. The method includes, in response to that a newly added compute resource is connected to a storage subsystem shared by compute resources in the distributed storage platform, formulating a redistribution plan to redistribute a subset of a global address space of the storage subsystem to a newly added logical volume in the storage subsystem, wherein the newly added logical volume is assigned to the newly added compute resource. The method further includes executing the redistribution plan to reassign data block ownerships on one or more physical memory devices in the storage subsystem, by modifying a mapping of respective logical block addresses in the storage subsystem to respective data block addresses on the one or more physical memory devices.

In another aspect, a computer-implemented method for optimized removal of a compute resource in a distributed storage platform is provided. The method includes, in response to that a removed compute resource is disconnected from a storage subsystem shared by compute resources in the distributed storage platform, formulating a redistribution plan of the storage subsystem to redistribute respective logical blocks in a logical volume for the removed compute resource to respective remaining logical volumes for respective remaining compute resources in the distributed storage platform. The method further includes executing the redistribution plan to reassign data block ownerships on one or more physical memory devices in the storage subsystem, by modifying a mapping of respective logical block addresses in the storage subsystem to respective data block addresses on the one or more physical memory devices.

In yet another aspect, a computer-implemented method for optimized compute resource addition and removal in a distributed storage platform is provided. The method includes, in response to that a newly added compute resource is connected to a storage subsystem shared by compute resources in the distributed storage platform, formulating a first redistribution plan of the storage subsystem to redistribute a subset of a global address space of the storage subsystem to a newly added logical volume in the storage subsystem, wherein the newly added logical volume is assigned to the newly added compute resource. The method further includes, in response to that a removed compute resource is disconnected from the storage subsystem shared by the compute resources in the distributed storage platform, formulating a second redistribution plan of the storage subsystem to redistribute respective logical blocks in a logical volume for the removed compute resource to respective remaining logical volumes for respective remaining compute resources in the distributed storage platform. The method further includes executing at least one of the first redistribution plan and the second redistribution plan to reassign data block ownerships on one or more physical memory devices in the storage subsystem, by modifying a mapping of respective logical block addresses in the storage subsystem to respective data block addresses on the one or more physical memory devices.

DETAILED DESCRIPTION

Embodiments of the present invention disclose an optimized scheme for redistributing storage resources amongst the compute resources of a distributed storage platform when compute resources are added or removed. The optimized scheme avoids expensive data block move operations. The physical movement of data is avoided by implementing mapping changes within the storage subsystem. By avoiding copying, time is saved and the utilization of resources in the distributed storage platform is reduced.

The present invention works by maintaining a mapping between compute resources and physical data blocks in a storage subsystem. When a compute resource is added or removed, an updated mapping is pushed down to the shared storage. Updating mapping takes place in the shared storage subsystem, effectively redistributing physical data blocks between compute resources but with no actual data move required.

The present invention allows for the disaggregation of storage from compute in a clustered solution in order to enable the dynamic addition and subtraction of compute resources without incurring the performance overhead of unnecessarily moving data. It is accomplished through an enhancement to the storage solution. The storage solution adds an abstraction layer between the compute node's logical storage blocks and the physical hardware blocks, whose ownership is redistributed among the compute resources when the topology is altered.

Figure 1:
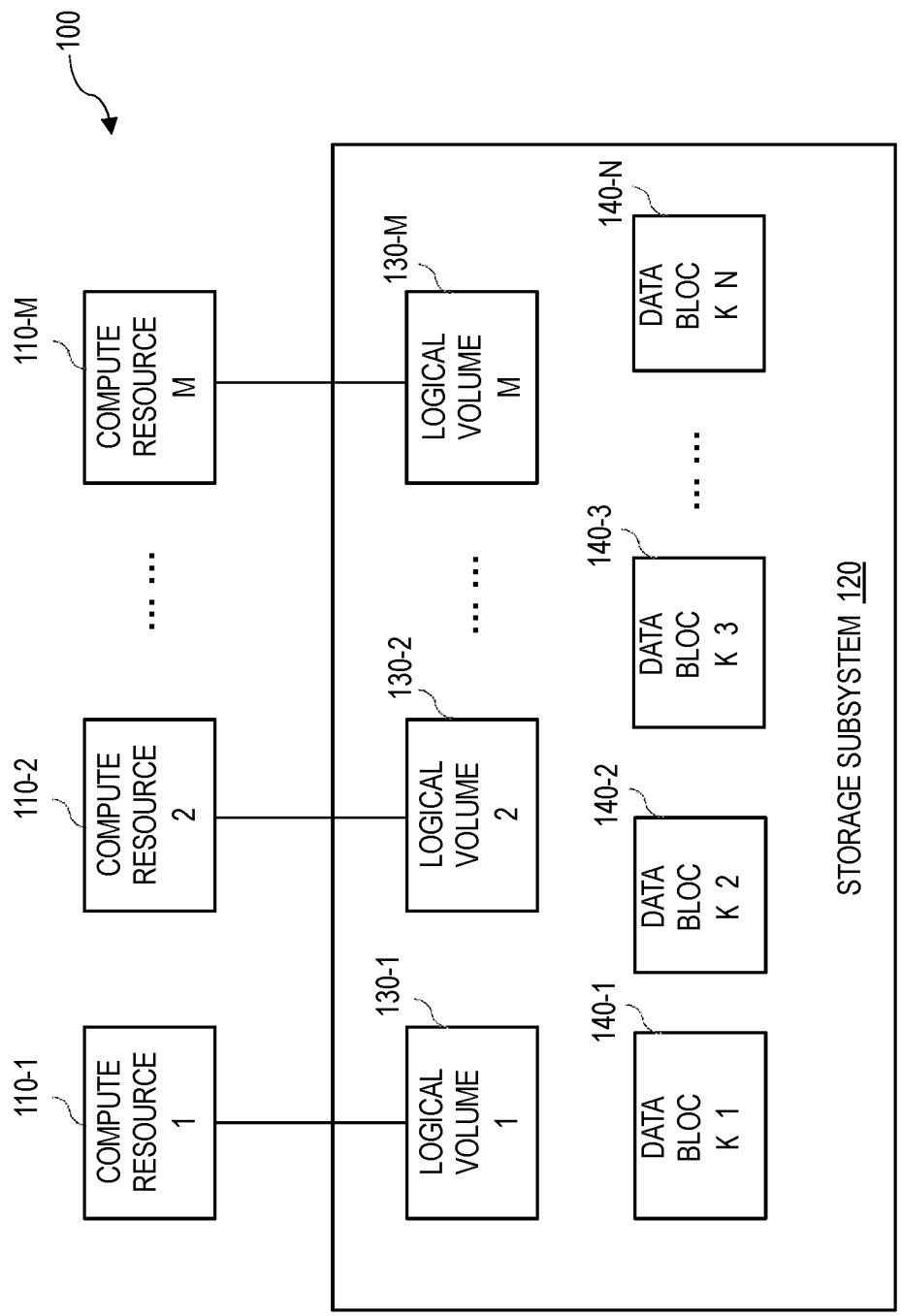
FIG. 1 is a diagram illustrating a distributed storage platform instance, in accordance with one embodiment of the present invention.

FIG. 1 is a diagram illustrating distributed storage platform instance 100, in accordance with one embodiment of the present invention. Distributed storage platform instance 100 includes M compute resources, namely computer resource 1 110-1, compute resource 2 110-2, and through compute resource M 110-M. M compute resources are attached to a single shared storage subsystem: storage subsystem 120 as shown in FIG. 1. Storage subsystem 120 is with N data blocks, namely data block 1 140-1, data block 2 140-2, data block 3 140-3, and through data block N 140-N. The N data blocks are divided up into M sets, each of which is assigned to its own logical volumes; therefore, storage subsystem 120 is with M logical volumes, namely logical volume 1 130-1, logical volume 2 130-2, and through logical volume M 130-M. The M logical volumes are assigned 1:1 to M compute resources, respectively; as shown in FIG. 1, logical volume 1 130-1 is assigned to computer resource 1 110-1, logical volume 2 130-2 to computer resource 2 110-2, and logical volume 1 130-M to computer resource 1 110-M.

The global address space provided by distributed storage platform instance 100 is the collection of logical block addresses provided by all logical volumes—logical volume 1 130-1, logical volume 2 130-2, and through logical volume M 130-M. Each client (i.e., a computational entity that stores or retrieves data in the global address space) possesses a mapping from a logical block address in the global address space to a compute resource, that allows I/O requests to be directed to an appropriate compute resource. The mapping from a logical block address in a logical volume to a data block address is maintained in storage subsystem 120.

Figure 2:
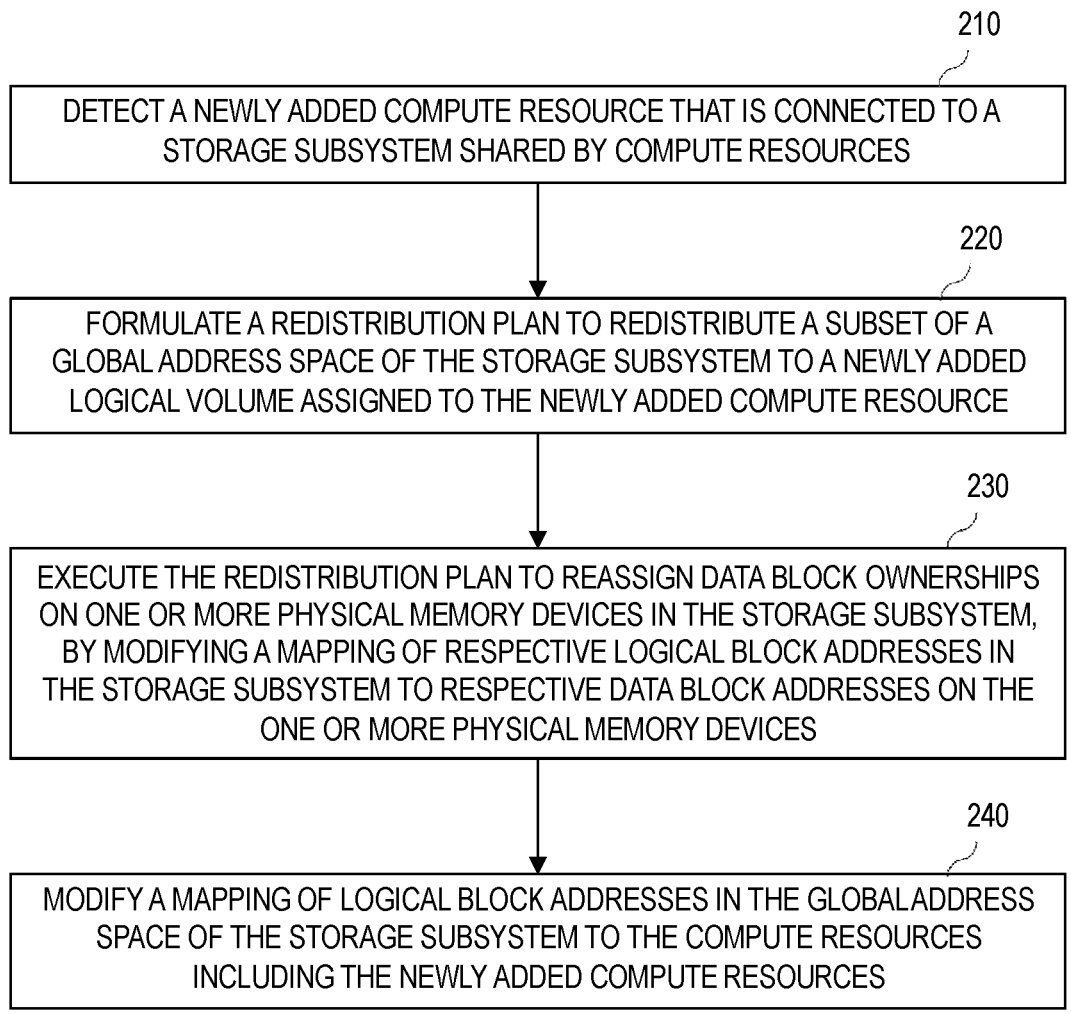
FIG. 2 is a flowchart showing operational steps of redistributing storage resources amongst compute resources of a distributed storage platform when a compute resource is added, in accordance with one embodiment of the present invention.

FIG. 2 present a flowchart showing operational steps of redistributing storage resources amongst compute resources of a distributed storage platform when a compute resource is added, in accordance with one embodiment of the present invention. The operational steps are implemented by the distributed storage platform (such as distributed storage platform instance 100 shown in FIG. 1) which is hosted by one or more servers. A server is described in more detail in later paragraphs with reference to FIG. 10. In some embodiments, the operational steps may be implemented in a cloud computing environment. The cloud computing environment is described in more detail in later paragraphs with reference to FIG. 11 and FIG. 12.

Referring to FIG. 2, at step 210, the distributed storage platform detects a newly added compute resource that is connected to a storage subsystem shared by compute resources. An additional compute resource is added to the distributed storage platform instance and connected to the shared storage subsystem. When the new compute resource is added to the distributed storage platform instance, the distributed storage platform creates an empty logical volume as a newly added logical volume in the storage subsystem and assigns the empty logical volume to the new compute resource.

Figure 3:
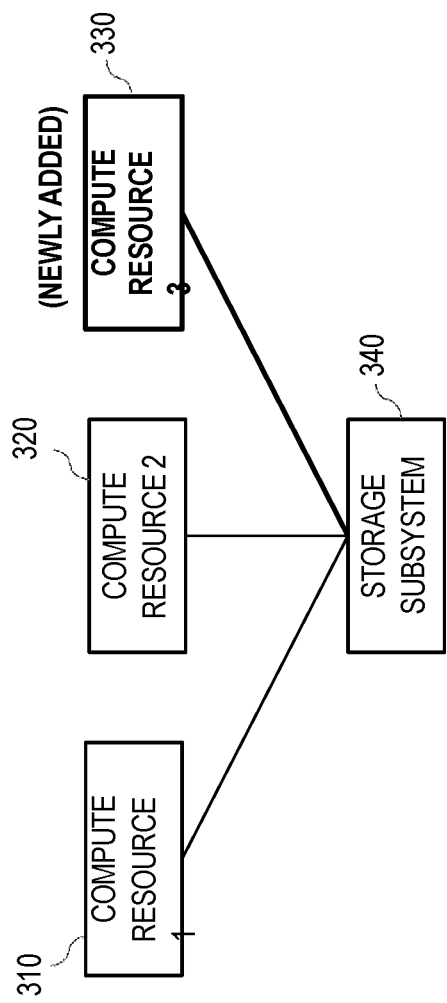
FIG. 3 is a diagram illustrating a compute resource is added to a distributed storage platform instance, in accordance with one embodiment of the present invention.

In an example shown in FIG. 3, compute resource 3 330 is added to the distributed storage platform instance, and compute resource 3 330 joins existing compute resources, compute resource 1 310 and compute resource 2 320, in the distributed storage platform instance. As shown in FIG. 3, the two existing compute resources (compute resource 1 310 and compute resource 2 320) and the newly added compute resource (compute resource 3 330) are attached to a single shared storage subsystem: storage sub system 340.

Referring back to FIG. 2, at step 220, the distributed storage platform formulates a redistribution plan to redistribute a subset of a global address space of the storage subsystem to a newly added logical volume that is assigned to the newly added compute resource. In effect, the redistribution plan will have the effect of redistributing N/(M+1) logical blocks from existing logical volumes (which has been assigned to existing compute resources) to the newly added logical volume (which is assigned to the newly added compute resource). N is the number of data blocks on physical drive(s) or physical memory device(s) of the storage subsystem, M is the number of the existing logical volumes assigned to M existing compute resources, and (M+1) is the number of the of the existing logical volumes plus the newly added logical volume. The redistribution plan is a list of pairs, where each pair includes a source logical block address and a target logical block address. The source logical block address is an address of a logical block in an existing logical volume assigned to an existing compute resource, while the target logical block address is an address of a logical block in the newly added logical volume. Regarding which logical blocks in the existing logical volumes are redistributed to the new logical volume, although exact algorithms for choosing the logical blocks to be redistributed is outside of the scope of the present invention, some algorithms such as round-robin may be used.

Figure 4:
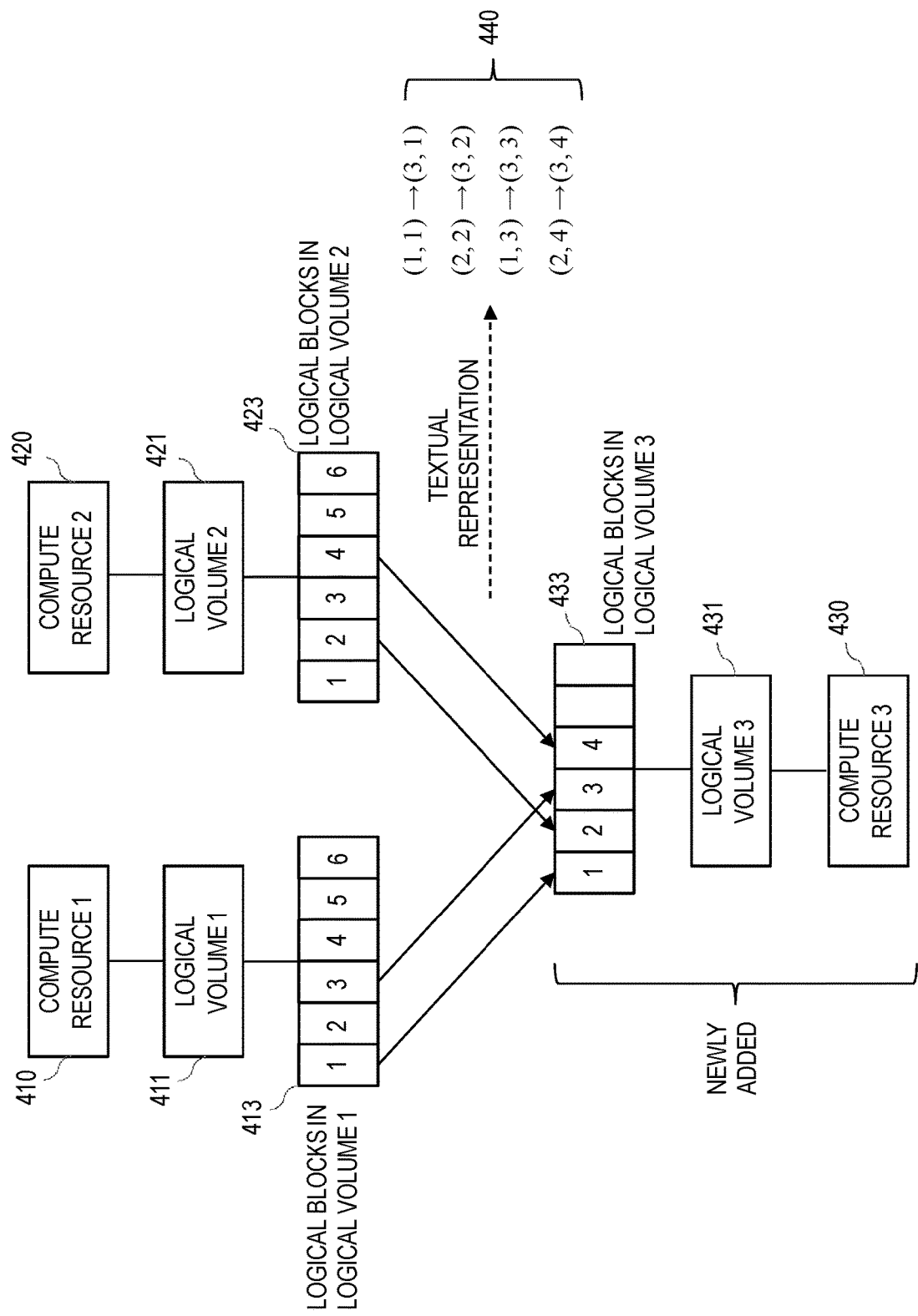
FIG. 4 is a diagram that illustrates forming a redistribution plan of a storage subsystem when a compute resource is added to a distributed storage platform instance, in accordance with one embodiment of the present invention.

In an example shown in FIG. 4, two existing compute devices are compute resource 1 410 and compute resource 2 420. Logical volume 1 411 is an existing logical volume that has been assigned to compute resource 1 410, and logical volume 1 411 has logical blocks 413 which includes 6 logical blocks. Logical volume 2 421 is an existing logical volume that has been assigned to compute resource 2 420, and logical volume 2 421 has logical blocks 423 which includes 6 logical blocks. The newly added compute resource is compute resource 3 430. Logical volume 3 431 is a newly added empty logical volume and assigned to compute resource 3 430. Logical blocks 433 is in logical volume 3 431.

In the example shown in FIG. 4, there are 12 data blocks (N=12), and the number of the existing logical volumes plus the newly added logical volume is 3 (M+1=3); therefore, in the redistribution plan, 4 logical blocks in logical blocks 413 and logical blocks 423 are planned to be redistributed from logical volume 1 411 and logical volume 2 421 (existing logical volumes) to logical volume 3 431 (newly added logical volume). Logical blocks 1 and 3 in logical volume 1 411 are planned to be redistributed to logical blocks 1 and 3 in logical volume 3 431, respectively. Logical blocks 2 and 4 in logical volume 2 421 are planned to be redistributed to logical blocks 2 and 4 in logical volume 3 431, respectively.

In FIG. 4, textual representation 440 of the redistribution plan is given. The notation of textual representation 440 is (source logical volume, source logical block)→(target logical volume, target logical block). (1, 1)→(3, 1) indicates that logical block 1 in logical volume 1 411 is to be redistributed to logical block 1 in logical volume 3 431; (2, 2)→(3, 2) indicates that logical block 2 in logical volume 2 421 is to be redistributed to logical block 2 in logical volume 3 431; (1, 3)→(3, 3) indicates that logical block 3 in logical volume 1 421 is to be redistributed to logical block 3 in logical volume 3 431; (2, 4)→(3, 4) indicates that logical block 4 in logical volume 2 421 is to be redistributed to logical block 4 in logical volume 3 431.

Referring back to FIG. 2, at step 230, the distributed storage platform executes the redistribution plan to reassign data block ownerships on one or more physical memory devices in the storage subsystem. At this step, the distributed storage platform modifies a mapping of respective logical block addresses in the storage subsystem to respective data block addresses on the one or more physical memory devices, according to the redistribution plan. Every entry in a mapping table containing a logical block address that is redistributed according to the redistribution plan will be modified.

Figure 5:
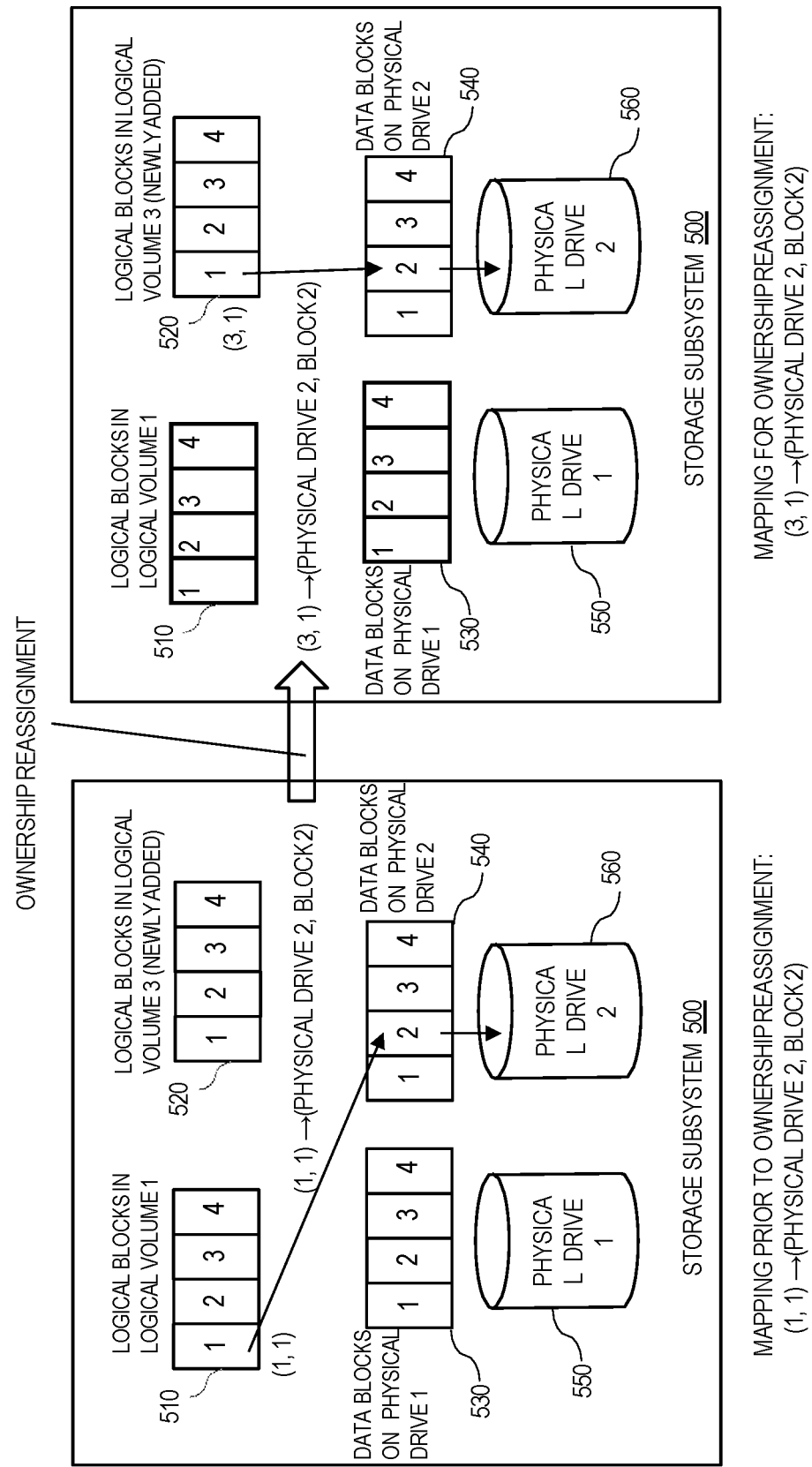
FIG. 5 is a diagram that illustrates executing the redistribution plan shown in FIG. 4 to reassign data block ownerships in a storage subsystem, in accordance with one embodiment of the present invention.

FIG. 5 shows an example of the data block ownership reassignment for a redistribution (1, 1)→(3, 1) in the redistribution plan shown in FIG. 4. The left side of FIG. 5 shows a mapping of a logical block address to a data block address prior to the data block ownership reassignment or prior to executing the redistribution plan, while the right side of FIG. 5 shows a mapping for the data block ownership reassignment.

Storage subsystem 500 shown in FIG. 5 includes logical blocks of two logical volumes related to the redistribution (1, 1)→(3, 1): logical blocks 510 of logical volume 1 (existing logical volume) and logical blocks 520 of logical volume 3 (newly added logical volume). Storage subsystem 500 shown in FIG. 5 further includes physical drive 1 550 and physical drive 2 560; physical drive 1 550 has data blocks 530 and physical drive 2 560 has data blocks 540.

Shown in FIG. 5, prior to the data block ownership reassignment or prior to executing the redistribution plan, the mapping table contains an entry: (1, 1)→(physical drive 2, block 2). The entry indicates that logical block 1 of logical blocks 510 in logical volume 1 is mapped to data block 2 of data blocks 540 on physical drive 2 560. The redistribution plan contains a mapping change: (1, 1)→(3, 1), which indicates that logical block 1 of logical blocks 510 in logical volume 1 is planned to be redistributed to logical block 1 of logical blocks 520 in logical volume 3. When executing the redistribution plan, the distributed storage platform modifies the mapping; a new mapping of a logical block to a physical data block will be (3, 1)→(physical drive 2, block 2). The new mapping indicates that block 1 of logical blocks 520 in logical volume 3 is mapped to data block 2 of data blocks 540 on physical drive 2 560.

Referring back to FIG. 2, at step 240, the distributed storage platform modifies a mapping of logical block addresses in the global address space of the storage subsystem to the compute resources including the newly added compute resources. A previous mapping of the logical block addresses in the global address space to respective existing compute resources is modified to include the newly added compute resource and logical blocks redistributed to the newly added logical volume. The resulting mapping is made visible to the clients, who can then direct their requests for logical blocks handled by the newly added compute resource, to the newly added compute resource.

Figure 6:
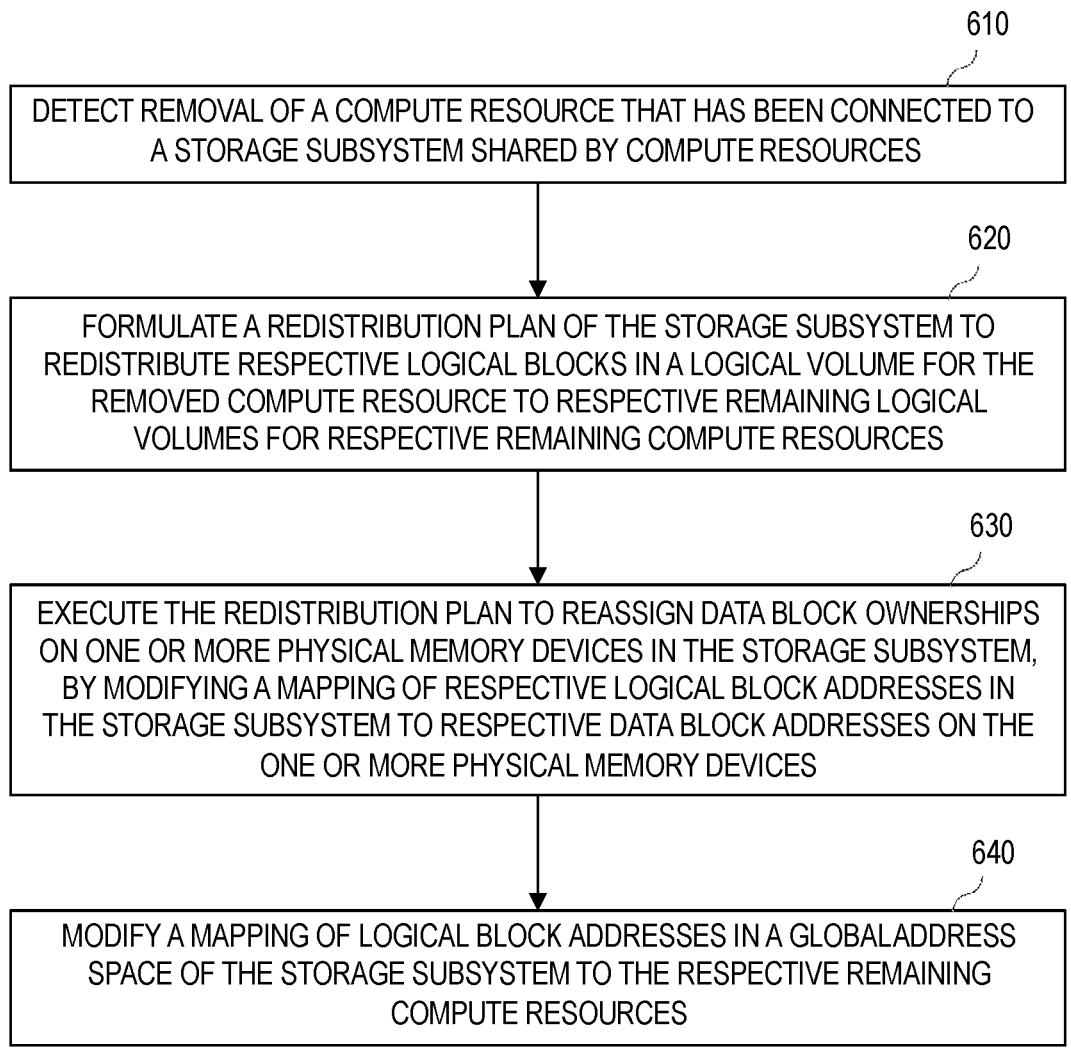
FIG. 6 is a flowchart showing operational steps of redistributing storage resources amongst compute resources of a distributed storage platform when a compute resource is removed, in accordance with one embodiment of the present invention.

FIG. 6 present a flowchart showing operational steps of redistributing storage resources amongst compute resources of a distributed storage platform when a compute resource is removed, in accordance with one embodiment of the present invention. The operational steps presented in FIG. 6 are implemented by the distributed storage platform (such as distributed storage platform instance 100 shown in FIG. 1) which is hosted by one or more servers. A server is described in more detail in later paragraphs with reference to FIG. 10. In some embodiments, the operational steps may be implemented in a cloud computing environment. The cloud computing environment is described in more detail in later paragraphs with reference to FIG. 11 and FIG. 12.

Referring to FIG. 6, at step 610, the distributed storage platform detects removal of a compute resource that has been connected to a storage subsystem shared by compute resources. The removed compute resource has been in the distributed storage platform instance and connected to the storage subsystem shared by compute resources. The removed compute resource is removed from the distributed storage platform and disconnected from the storage subsystem.

Figure 7:
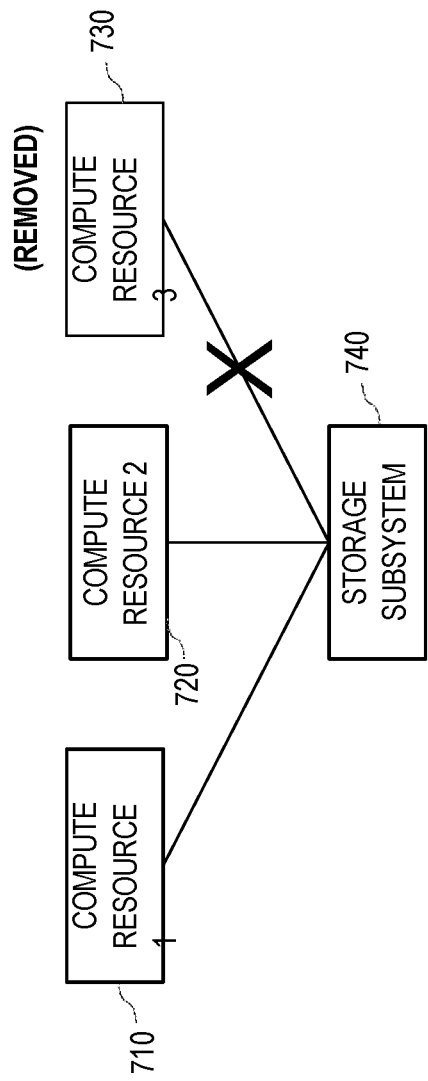
FIG. 7 is a diagram illustrating a compute resource is removed from a distributed storage platform instance, in accordance with one embodiment of the present invention.

In an example shown in FIG. 7, compute resource 3 730 is removed from the distributed storage platform instance and disconnected from storage subsystem 740. Compute resource 1 710 and compute resource 2 720 are two remaining compute resources in the distributed storage platform instance. As shown in FIG. 7, the two remaining compute resources (compute resource 1 710 and compute resource 2 720) are attached to a single shared storage subsystem: storage subsystem 740.

Referring back to FIG. 6, at step 620, the distributed storage platform formulates a redistribution plan to redistribute respective logical blocks in a logical volume for the removed compute resource to respective remaining logical volumes for respective remaining compute resources in the distributed storage platform. The redistribution plan is a list of pairs, where each pair includes a source logical block address and a target logical block address. The source logical block address is an address of a logical block in the logical volume which has been assigned to the removed compute resource, while the target logical block address in an address of a logical block in a logical volume assigned to a remaining compute resource.

Figure 8:
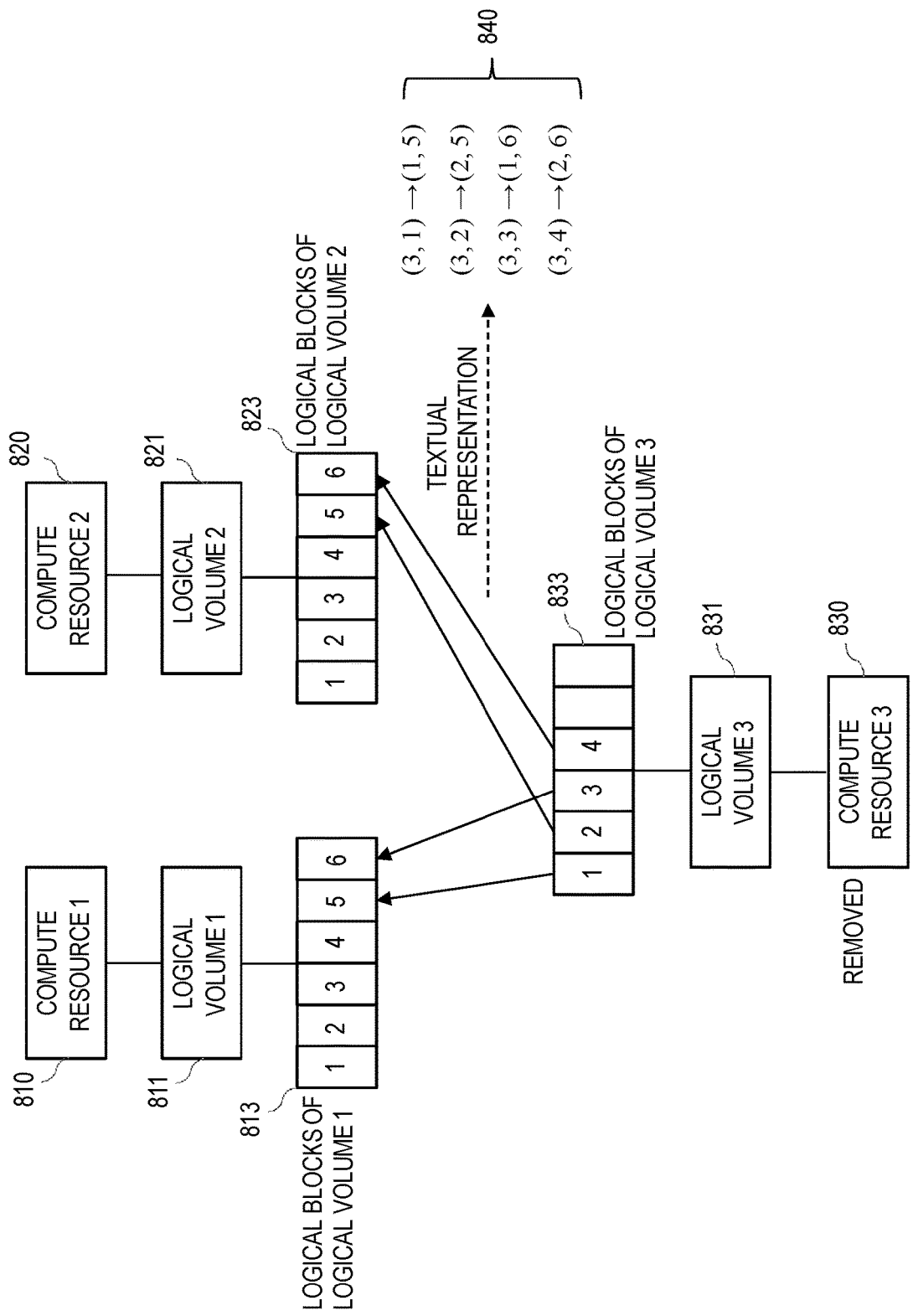
FIG. 8 is a diagram that illustrates forming a redistribution plan of a storage subsystem when a compute resource is removed, in accordance with one embodiment of the present invention.

In an example shown in FIG. 8, compute resource 3 830 is the removed compute resource. Logical volume 3 831 has been assigned to compute resource 3 830 and it includes logic blocks 833. Compute resource 1 810 and compute resource 2 820 are remaining compute resources in the distributed storage platform. Logical volume 1 811 is a remaining logical volume assigned to compute resource 1 810, and logical volume 1 811 has logical blocks 413 which includes 4 logical blocks (1, 2, 3, and 4) prior to the logical blocks redistribution. Similarly, logical volume 2 821 is a remaining logical volume assigned to compute resource 2 820, and logical volume 1 821 has logical blocks 823 which includes 4 logical blocks (1, 2, 3, and 4) prior to the logical blocks redistribution.

In the example shown in FIG. 8, logical block 1 in logical volume 3 831 is planned to be redistributed to logical block 5 in logical volume 1 811, logical block 2 in logical volume 3 831 is planned to be redistributed to logical block 5 in logical volume 2 821, logical block 3 in logical volume 3 831 is planned to be redistributed to logical block 6 in logical volume 1 811, and logical block 4 in logical volume 3 831 is planned to be redistributed to logical block 6 in logical volume 2 821.

In FIG. 8, textual representation 840 of the redistribution plan is given. The notation of textual representation 840 is (source logical volume, source logical block)→(target logical volume, target logical block). (3, 1)→(1, 5) indicates that logical block 1 in logical volume 3 831 is to be redistributed to logical block 5 in logical volume 1 811; (3, 2)→(2, 5) indicates that logical block 2 in logical volume 3 831 is to be redistributed to logical block 5 in logical volume 2 821; (3, 3)→(1, 6) indicates that logical block 3 in logical volume 3 831 is to be redistributed to logical block 6 in logical volume 1 811; (3, 4)→(2, 6) indicates that logical block 4 in logical volume 3 831 is to be redistributed to logical block 6 in logical volume 2 821.

Referring back to FIG. 6, at step 630, the distributed storage platform executes the redistribution plan to reassign data block ownerships on one or more physical memory devices in the storage subsystem. At this step, the distributed storage platform modifies a mapping of respective logical block addresses in the storage subsystem to respective data block addresses on the one or more physical memory devices, according to the redistribution plan.

Figure 9:
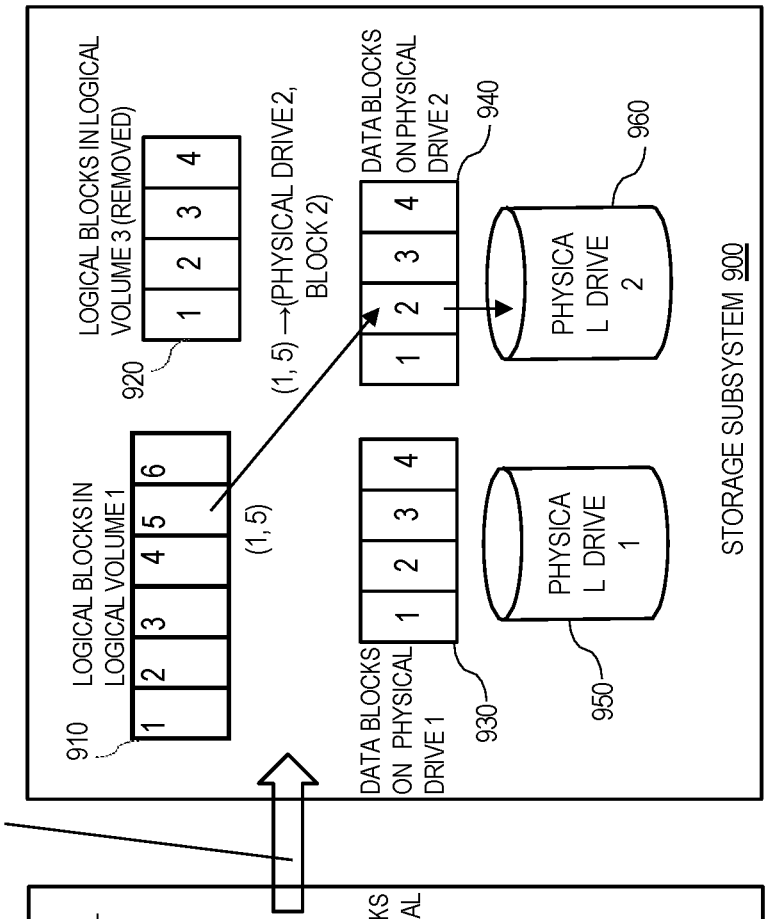
FIG. 9 is a diagram that illustrates executing the redistribution plan shown in FIG. 8 to reassign data block ownerships in a storage subsystem, in accordance with one embodiment of the present invention.
Figure 9:
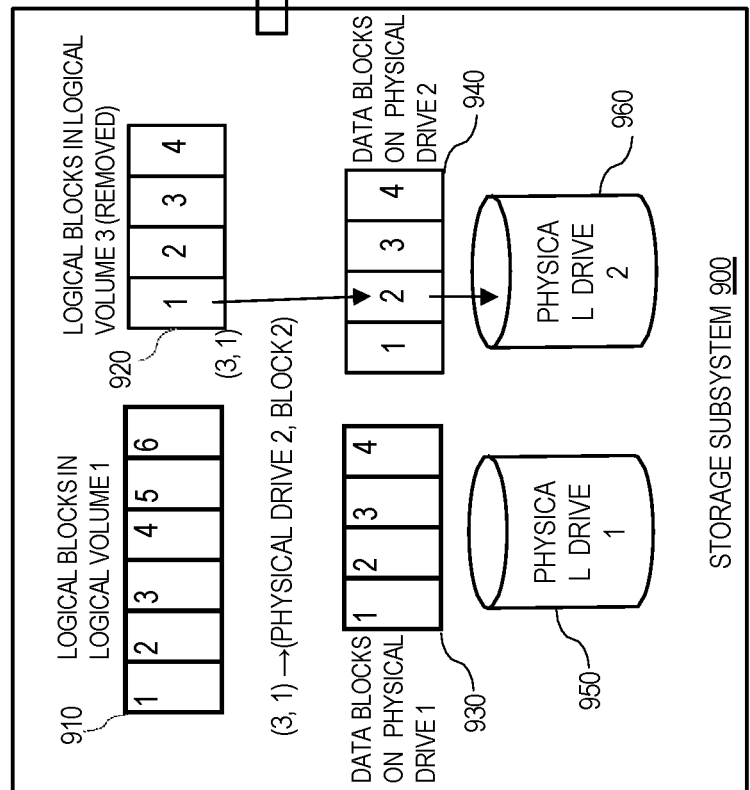

FIG. 9 shows an example of data block ownership reassignment for a redistribution (3, 1)→(1, 5) in the redistribution plan shown in FIG. 8. The left side of FIG. 9 shows a mapping of a logical block address to a data block address prior to the data block ownership reassignment or prior to executing the redistribution plan, while the right side of FIG. 9 shows a mapping for the data block ownership reassignment.

Storage subsystem 900 shown in FIG. 9 includes logical blocks of two logical volumes related to the redistribution (3, 1)→(1, 5): logical blocks 910 in logical volume 1 (remaining logical volume assigned to compute resource 1) and logical blocks 920 in logical volume 3 (logical volume assigned to the removed compute resource). Storage subsystem 900 shown in FIG. 9 further includes physical drive 1 950 and physical drive 2 960; physical drive 1 950 has data blocks 930 and physical drive 2 960 has data blocks 940.

Shown in FIG. 9, prior to the data block ownership reassignment or prior to executing the redistribution plan, the mapping table contains an entry: (3, 1)→(physical drive 2, block 2). The entry indicates that logical block 1 of logical blocks 920 in logical volume 3 is mapped to data block 2 on physical drive 2 960. The redistribution plan contains a mapping change: (3, 1)→(1, 5), which indicates that logical block 1 of logical blocks 920 in logical volume 3 is planned to be redistributed to logical block 5 of logical blocks 910 in logical volume 1. When executing the redistribution plan, the distributed storage platform modifies the mapping; a new mapping of a logical block to a physical block will be (1, 5)→(physical drive 2, block 2). The new mapping indicates that logical block 5 of logical blocks 910 in logical volume 1 is mapped to data block 2 on physical drive 2 960.

Referring back to FIG. 6, at step 640, the distributed storage platform modifies a mapping of logical block addresses in a global address space of the storage subsystem to the respective remaining compute resources. A previous mapping of the logical block addresses in the global address space to respective compute resources is modified to exclude the removed compute resource (such as compute resource 3 730 shown in FIG. 7) and to include the logical blocks redistributed to the remaining logical volumes.

Figure 10:
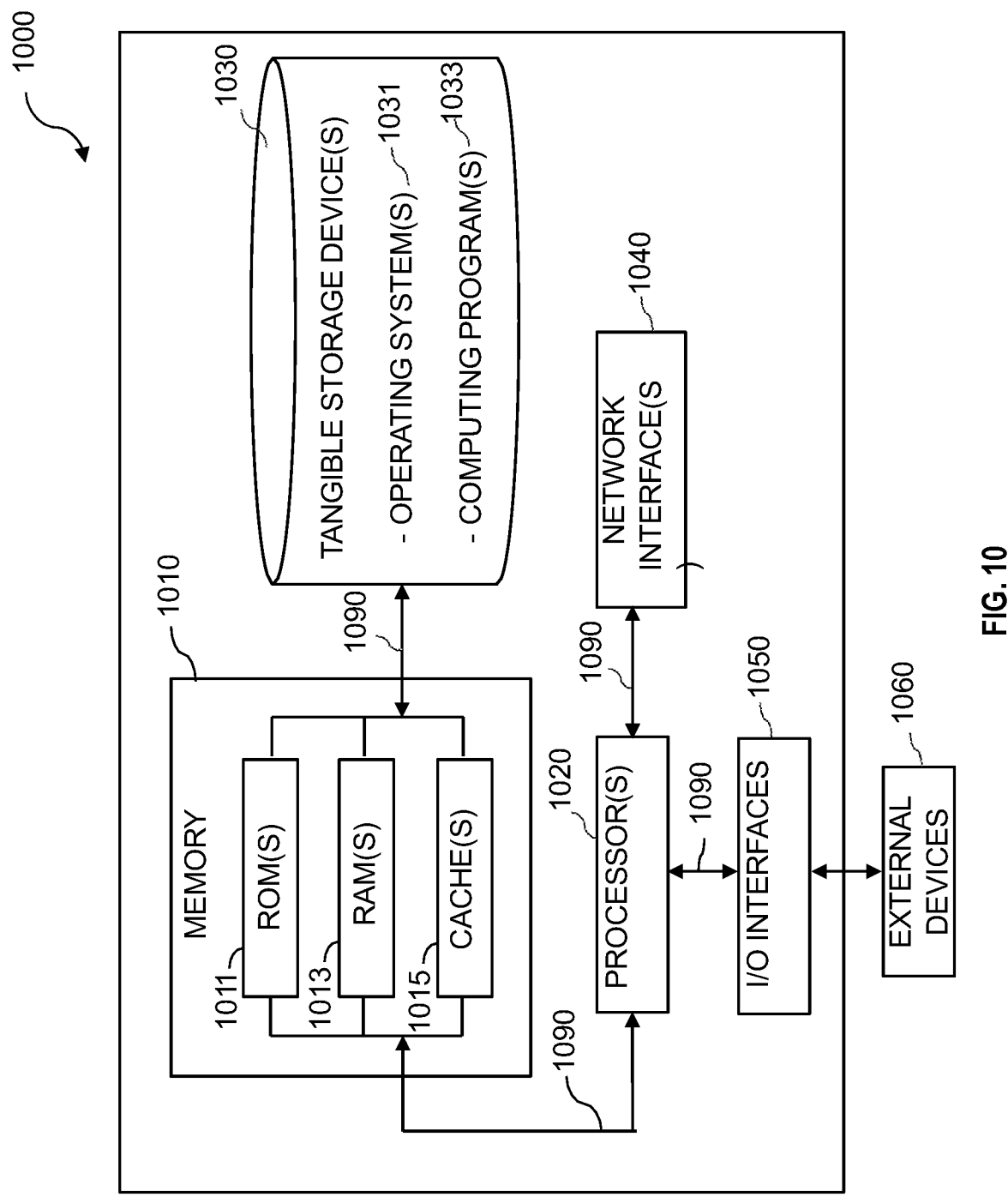
FIG. 10 is a diagram illustrating components of a server, in accordance with one embodiment of the present invention.

FIG. 10 is a diagram illustrating components of server 1000, in accordance with one embodiment of the present invention. It should be appreciated that FIG. 10 provides only an illustration of one implementation and does not imply any limitations with regard to the environment in which different embodiments may be implemented.

Referring to FIG. 10, server 1000 includes processor(s) 1020, memory 1010, and tangible storage device(s) 1030. In FIG. 10, communications among the above-mentioned components of server 1000 are denoted by numeral 1090. Memory 1010 includes ROM(s) (Read Only Memory) 1011, RAM(s) (Random Access Memory) 1013, and cache(s) 1015. One or more operating systems 1031 and one or more computer programs 1033 reside on one or more computer readable tangible storage device(s) 1030.

Server 1000 further includes I/O interface(s) 1050. I/O interface(s) 1050 allows for input and output of data with external device(s) 1060 that may be connected to computing device or server 1000. Server 1000 further includes network interface(s) 1040 for communications between server 1000 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
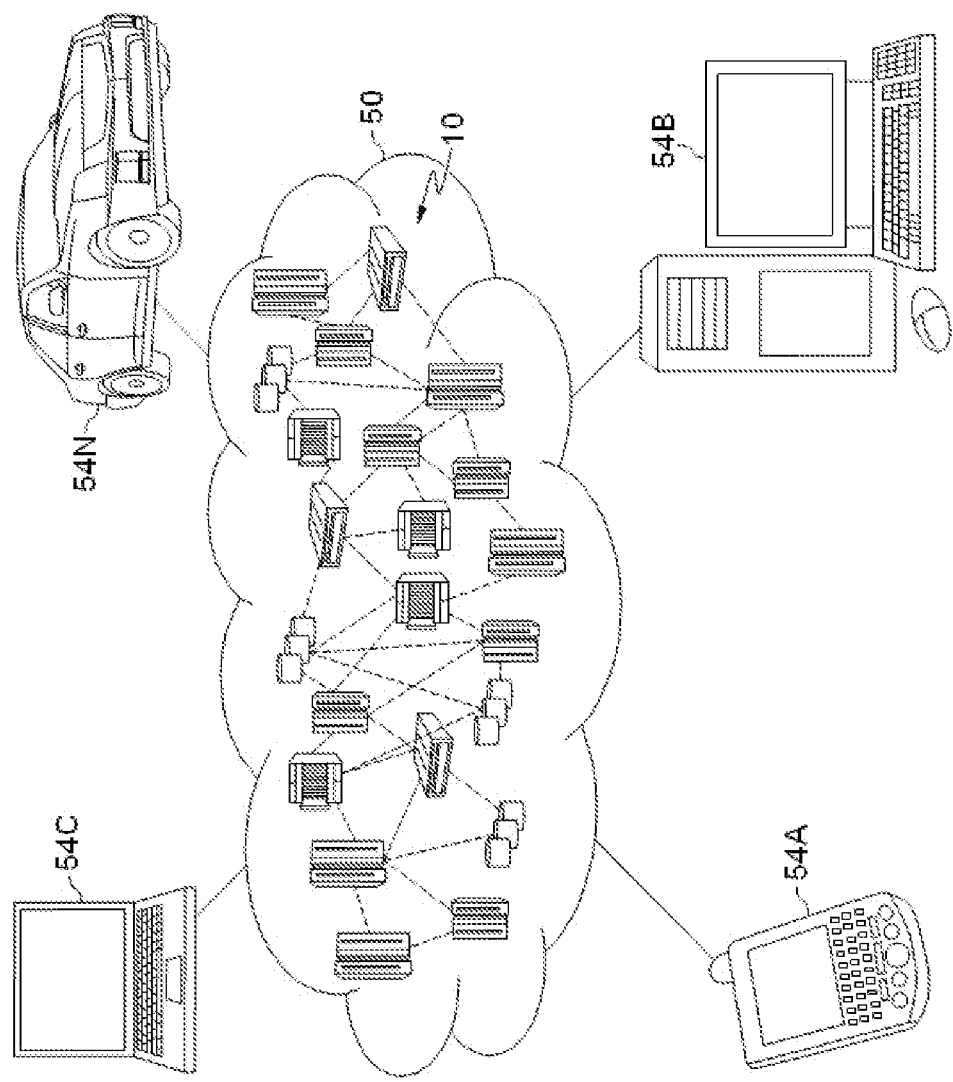
FIG. 11 depicts a cloud computing environment, in accordance with one embodiment of the present invention.

Referring now to FIG. 11, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 12:
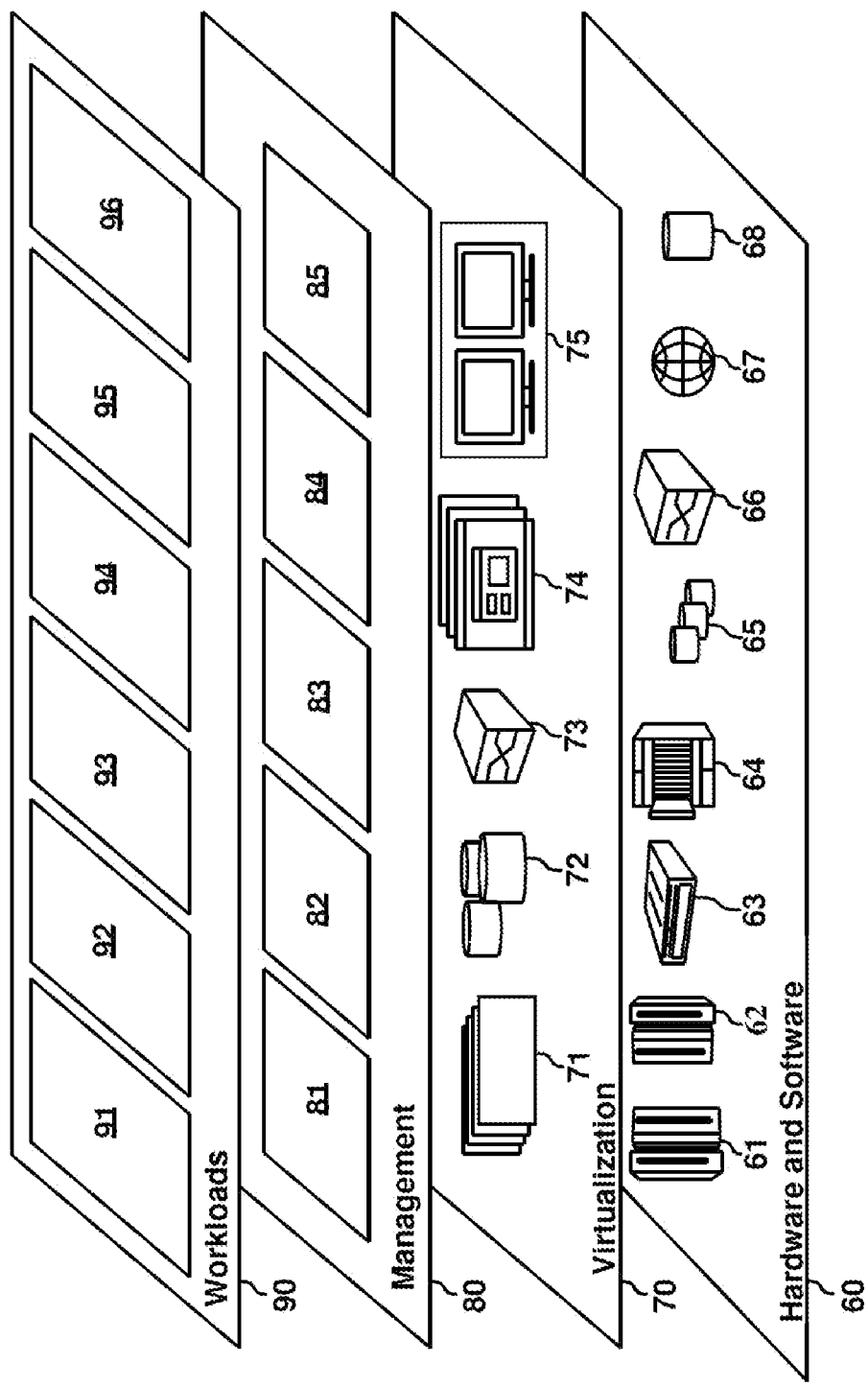
FIG. 12 depicts abstraction model layers in a cloud computing environment, in accordance with one embodiment of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of redistributing storage resources amongst the compute resources of a distributed storage platform when compute resources are added or removed in a cloud computing environment.

What is claimed is:

1. A computer-implemented method for optimized addition of a compute resource in a distributed storage platform, the method comprising:
   in response to that a newly added compute resource is connected to a storage subsystem shared by compute resources in the distributed storage platform, formulating a redistribution plan to redistribute a subset of a global address space of the storage subsystem to a newly added logical volume in the storage subsystem, wherein the newly added logical volume is assigned to the newly added compute resource;
   executing the redistribution plan to reassign data block ownerships on one or more physical memory devices in the storage subsystem, by modifying a mapping of respective logical block addresses in the storage subsystem to respective data block addresses on the one or more physical memory devices; and
   wherein the redistribution plan is a list of pairs, wherein each pair includes a source logical block address and a target logical block address, wherein the source logical block address is an address of a logical block in an existing logical volume assigned to an existing compute resource and the target logical block address is an address of a logical block in the newly added logical volume.

2. The computer-implemented method of claim 1, further comprising:
   detecting addition of the newly added compute resource in the distributed storage platform.

3. The computer-implemented method of claim 2, further comprising:
   in response to the newly added compute resource is detected, creating an empty logical volume as the newly added logical volume in the storage subsystem; and
   assigning the empty logical volume to the newly added compute resource.

4. The computer-implemented method of claim 1, further comprising:
   modifying a mapping of logical block addresses in the global address space of the storage subsystem to the compute resources including the newly added compute resources.

5. The computer-implemented method of claim 1, wherein N/(M+1) blocks from existing logical volumes assigned to existing compute resources in the distributed storage platform are redistributed to the newly added logical volume, wherein N is a number of data blocks in the storage subsystem, wherein M is a number of the existing logical volumes.

6. The computer-implemented method of claim 1, wherein, in modifying the mapping, an entry containing a logical block address that is redistributed according to the redistribution plan is modified.

7. A computer-implemented method for optimized removal of a compute resource in a distributed storage platform, the method comprising:
   in response to that a removed compute resource is disconnected from a storage subsystem shared by compute resources in the distributed storage platform, formulating a redistribution plan of the storage subsystem to redistribute respective logical blocks in a logical volume for the removed compute resource to respective remaining logical volumes for respective remaining compute resources in the distributed storage platform;
   executing the redistribution plan to reassign data block ownerships on one or more physical memory devices in the storage subsystem, by modifying a mapping of respective logical block addresses in the storage subsystem to respective data block addresses on the one or more physical memory devices; and
   wherein the redistribution plan is a list of pairs, wherein each pair includes a source logical block address and a target logical block address, wherein the source logical block address is an address of a logical block in the logical volume for the removed compute resource and the target logical block address is an address of a logical block in a logical volume for a remaining compute resource.

8. The computer-implemented method of claim 7, further comprising:
   detecting removal of the removed compute resource in the distributed storage platform.

9. The computer-implemented method of claim 7, further comprising:
   modifying a mapping of logical block addresses in a global address space of the storage subsystem to the respective remaining compute resources.

10. The computer-implemented method of claim 7, wherein, in modifying the mapping, an entry containing a logical block address that is redistributed according to the redistribution plan is modified.

11. A computer-implemented method for optimized compute resource addition and removal in a distributed storage platform, the method comprising:
    in response to that a newly added compute resource is connected to a storage subsystem shared by compute resources in the distributed storage platform, formulating a first redistribution plan of the storage subsystem to redistribute a subset of a global address space of the storage subsystem to a newly added logical volume in the storage subsystem, wherein the newly added logical volume is assigned to the newly added compute resource;
    in response to that a removed compute resource is disconnected from the storage subsystem shared by the compute resources in the distributed storage platform, formulating a second redistribution plan of the storage subsystem to redistribute respective logical blocks in a logical volume for the removed compute resource to respective remaining logical volumes for respective remaining compute resources in the distributed storage platform; and executing at least one of the first redistribution plan and the second redistribution plan to reassign data block ownerships on one or more physical memory devices in the storage subsystem, by modifying a mapping of respective logical block addresses in the storage subsystem to respective data block addresses on the one or more physical memory devices;

wherein the first redistribution plan is a list of pairs, wherein each pair includes a source logical block address and a target logical block address, wherein the source logical block address is an address of a logical block in an existing logical volume assigned to an existing compute resource and the target logical block address is an address of a logical block in the newly added logical volume; and wherein the second redistribution plan is a list of pairs, wherein each pair includes a source logical block address and a target logical block address, wherein the source logical block address is an address of a logical block in the logical volume for the removed compute resource and the target logical block address is an address of a logical block in a logical volume for a remaining compute resource.

12. The computer-implemented method of claim 11, further comprising:

in response to that the newly added compute resource is connected to the storage subsystem, creating an empty logical volume as the newly added logical volume in the storage subsystem; and assigning the empty logical volume to the newly added compute resource.

13. The computer-implemented method of claim 11, further comprising:

in response to that the newly added compute resource is connected to the storage subsystem, modifying a mapping of logical block addresses in the global address space of the storage subsystem to the compute resources including the newly added compute resources.

14. The computer-implemented method of claim 11, further comprising:

in response to that the removed compute resource is disconnected from the storage subsystem, modifying a mapping of logical block addresses in the global address space of the storage subsystem to the respective remaining compute resources.

15. The computer-implemented method of claim 11, wherein, in modifying the mapping, an entry containing a logical block address that is redistributed according to the redistribution plan is modified.

16. The computer-implemented method of claim 11, wherein N/(M+1) blocks from existing logical volumes assigned to existing compute resources in the distributed storage platform are redistributed to the newly added logical volume, wherein N is a number of data blocks in the storage subsystem, wherein M is a number of the existing logical volumes.

\* \* \* \* \*